(No Model.)
C. LEDUC.
MACHINE FOR MAKING TULE BUNCHES FOR LIFE PRESERVERS.
No. 317,551. Patented May 12, 1885.
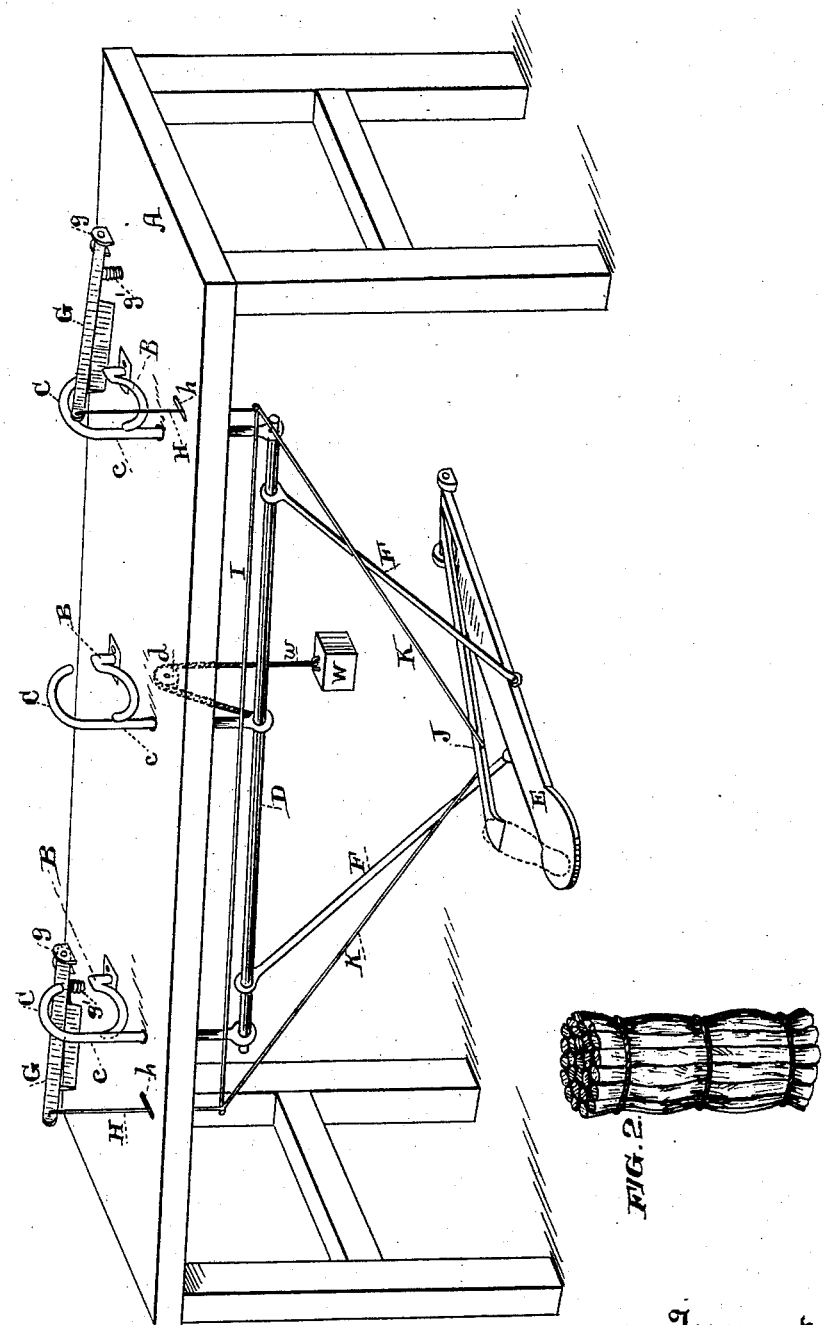

UNITED STATES PATENT OFFICE.

CONSTANT LEDUC, OF STOCKTON, CALIFORNIA.

MACHINE FOR MAKING TULE BUNCHES FOR LIFE-PRESERVERS.

SPECIFICATION forming part of Letters Patent No. 317,551, dated May 12, 1885.

Application filed December 16, 1884. (No model.)

*To all whom it may concern:*

Be it known that I, CONSTANT LEDUC, of Stockton, county of San Joaquin, and State of California, have invented an Improvement in Machines for Making Tule Bunches for Life-Preservers; and I hereby declare the following to be a full, clear, and exact description thereof.

My invention relates to a new and useful machine for making the bunches of tule-grass to be used in the formation of life-preservers.

The nature and object of my invention will be better understood by a brief reference to the nature of the life-preservers in the construction of which the tule-bunches are used. In Letters Patent of the United States No. 282,651, which were issued to me August 7, 1883, a life-preserver of this class is described and illustrated, and for the sake of greater clearness I shall quote from the specification, as follows: "It (the life-preserver) consists in a suitable band, belt, mattress, or garment constructed wholly or in part of the dried stalks or stems of what is commonly known as 'tule' or 'tule-grass.' This is a large club rush or sedge of the order *Cyperaceæ*, and known scientifically as *Scirpus validus*. It grows in marshy places, and while found in several portions of the United States, is particularly abundant in California, where it grows to a great height, and its stems attain considerable diameter." The specification then proceeds to set forth the buoyant properties of the tule and its fitness for a life-preserver.

The life-preserver is made up of a number of bunches of the dried stalks or stems of the tule, and each bunch consists of a suitable number of stems properly tied, as I have illustrated in the present application by Fig. 2. The object of my present invention or machine is to make these bunches; and my invention consists in bed or die strips, upon which the stems are laid in reciprocating or vertically-moving presser-strips, adapted to be forced down upon the stems to press them into a bunch between themselves and the die-strips, and in swinging knives suitably arranged to cut the end of the bunch so that all the stems forming it are made of equal length.

My invention further consists in the mechanisms, hereinafter described, by which the necessary movements are effected, and in details of construction, all of which I shall hereinafter fully describe.

Referring to the accompanying drawings, Figure 1 is a perspective view of my machine. Fig. 2 is a view of the bunch.

A is a stand or table, upon which at suitable intervals are firmly secured the semicircular or concave bed or die strips B.

C are correspondingly curved or concaved presser-strips, the stems $c$ of which pass down loosely through the table at one side of the die-strips B, and are connected below by a tie rod or shaft, D. The presser-strips C are located to one side of the vertical plane of the die-strips B, so that when pressed down they move beside said strips. Their downward adjustment is accomplished by means of a pivoted treadle, E, under the table, from which rods F extend to the tie-rod D. A weight, W, suspended by a cord, $w$, the other end of which is attached to the tie-rod D and passes upward over a suitable pulley, $d$, under the table, causes the presser-strips to move upward when the treadle is relieved.

G are knives pivoted to bearings $g$ on the top of the table and provided with springs $g'$, by which they are raised to their position. These knives play down beside the die-strips B, and are operated by means of the rods H, attached to their ends, which pass down through slots $h$ in the table and are connected together by means of a tie-rod, I, and are also connected to a treadle, J, by means of the rods K.

The treadle J is pivoted on the same pin as the treadle E and lies just above it.

The operation of the device is as follows: The dried stems or stalks of the tule are laid in suitable number lengthwise in the curved die-strips B. The heel of the operator's foot is placed upon the treadle E, while the toe rests upon the treadle J. The downward movement of the foot effects the following results. Through the treadle E, rods F, and tie-rod D, the presser-strips C are brought down upon the tule, pressing the various stems compactly at the circles of contact, and holding them all in a bunch, at the same time the downward movement of the treadle J, through the rods K and H, brings down the knives, which cut the ends of the bunch, so that its stems are of equal length. As the knives have to be moved through a greater distance than the presser-strips, for the reason that said knives have to pass entirely through the bunch, the location of the treadle J provides for this result. Normally it lies above treadle E, and therefore in reaching the limit of its stroke, which is parallel with and upon the treadle E, it has to move through the greater distance, and thereby the two treadles effect in one stroke the greater movement of the knives G and the lesser movement of the presser-strips C. While the presser-strips are still held down the operator ties the bunch by passing his strings or wires under and around it, near where it is compressed, which he is enabled to do by reason of the die-strips B holding it above the table.

It is obvious that I may indefinitely increase the capacity of the machine by extending the table A and increasing the number of die and presser strips and knives, so that as many bunches may be made at once as will be found convenient to handle.

If it be desirable to tie or wire the bunches at each end only, a knife will be located beside each die and presser-strip, and the distance between each pair of said strips will be just sufficient to receive and form between them a single bunch; but if it be found preferable to tie or wire the bunch in the center as well as at the ends, as is shown in Fig. 2, it will be necessary to place an intermediate die and presser-strip unaccompanied by a knife, as is shown in Fig. 1. In this manner the location of the strips can be varied to a greater or less extent, the knife, however, being fixed beside that pair of strips which defines the limit of length of the bunch.

This machine is as applicable to the manufacture of bunches of stalks or stems of any reeds, rushes, grasses, and other buoyant substances of similar nature as to the tule-stems.

I do not confine myself entirely to the particular mechanisms here shown for accomplishing the movements of the presser-strips and knives, for these may be varied in many ways, which would be suggested to the ordinary mechanical mind—for example, by the substitution of belts and winding-drums operated by cranks applied separately or jointly to the presser-strips and knives, and the change of motive power from the foot to hand, horse, water, or steam power, according to the conveniences within reach. These changes would not affect the nature of my invention, which lies mainly in the die or bed strips, the vertically adjustable or reciprocating presser-strips, and the vibrating or swinging knives.

Having thus described my invention, what I claim as new, and desire to secure by Letters Patent, is—

1. In a machine for making tule bunches for life-preservers, the combination of die or bed strips, in which the stems are laid, reciprocating presser-strips adapted to bind the stems between themselves and the die-strips, and vibrating or swinging knives secured to the table and adapted to cut the stems so held into equal lengths, substantially as herein described.

2. In a machine for making tule bunches for life-preservers, the combination of the die or bed strips B, the vertically adjustable or reciprocating presser-strips C at one side of the die-strips, and the vibrating or swinging knives G on the other side and secured to the table, substantially as herein described.

3. In a machine for making tule bunches for life-preservers, the table A and the die or bed strips B, fixed thereon, in combination with the presser-strips C, having stems $c$ passing down through the table, and the means for reciprocating said presser-strips, consisting of the treadle E, tie-rod D, connecting the stems $c$, rods F, connecting the treadle with the tie-rod, and weighted cord $w$, all arranged and operating substantially as herein described.

4. In a machine for making tule bunches for life-preservers, the table A and the die or bed strips B, fixed thereon, in combination with the presser-strips C, the pivoted knives G, and a mechanism by which presser-strips and the knives are simultaneously reciprocated and vibrated, respectively, the former to bind down upon the tule-stems and the latter to cut through them, substantially as herein described.

5. In a machine for making tule bunches for life-preservers, the table A and the die or bed strips B, fixed thereon, in combination with the reciprocating or vertically-adjustable presser-strips C, the pivoted knives G, and the means for operating said knives, consisting of the treadle J, connecting-rods H K, and springs $g'$, substantially as herein described.

6. In a machine for making tule bunches for life-preservers, the table A and curved or concaved die or bed strips B, fixed thereon, in combination with the curved or concaved presser-strips C, having stems $c$, the pivoted knives G, and the means by which the presser-strips and the knives are simultaneously reciprocated and vibrated, respectively, for the purpose described, consisting of the independent treadles E J, pivoted in the same line, and one lying above the other, the rods F D, connecting treadle E with the presser-strips, the rods H K, connecting treadle J with the knives, the weighted cord $w$, to raise the presser-strips, and the springs $g'$, to raise the knives, substantially as herein described.

In witness whereof I have hereunto set my hand.

CONSTANT LEDUC.

Witnesses:
JAS. M. McCARTY,
J. G. SAWYER.